United States Patent [19]

Pla

[11] Patent Number: 5,370,340

[45] Date of Patent: Dec. 6, 1994

[54] ACTIVE CONTROL OF AIRCRAFT ENGINE NOISE USING VIBRATIONAL INPUTS

[75] Inventor: Frederic G. Pla, Schenectady, N.Y.

[73] Assignee: General Electric Company, Schenectady, N.Y.

[21] Appl. No.: 51,810

[22] Filed: Apr. 21, 1993

Related U.S. Application Data

[63] Continuation of Ser. No. 787,471, Nov. 4, 1991, abandoned.

[51] Int. Cl.⁵ .................... G10K 11/16; F01D 5/26
[52] U.S. Cl. ........................ 244/1 N; 181/206; 381/71
[58] Field of Search .......... 244/1 N, 1 R, 53 R, 244/134 D, 134 R; 181/206, 20; 381/71, 152; 310/322-324

[56] References Cited

U.S. PATENT DOCUMENTS

| | | | |
|---|---|---|---|
| 1,628,230 | 5/1927 | Coburn et al. | 381/152 |
| 1,688,743 | 10/1928 | Nicholson | 381/152 |
| 3,178,512 | 4/1965 | Ashword | 381/152 |
| 3,239,678 | 3/1966 | Kolm et al. | 310/322 |
| 4,044,203 | 8/1977 | Swinbanks | 381/71 |
| 4,255,083 | 3/1981 | Andre et al. | 181/206 |
| 4,392,627 | 7/1983 | Bock | 381/152 |
| 4,551,849 | 11/1985 | Kasai et al. | 381/152 |
| 4,689,821 | 8/1987 | Salikuddin et al. | 381/71 |
| 4,715,559 | 12/1987 | Fuller | 244/1 N |
| 4,751,419 | 6/1988 | Takahata | 310/322 |
| 4,805,733 | 2/1989 | Kate et al. | 381/71 |
| 4,947,356 | 8/1990 | Elliott et al. | 364/574 |
| 4,947,434 | 8/1990 | Ito | 244/1 N |
| 4,987,598 | 1/1991 | Eriksson | 381/71 |

Primary Examiner—Galen L. Barefoot
Attorney, Agent, or Firm—Patrick R. Scanlon; Paul R. Webb, II

[57] ABSTRACT

An active noise control system which minimizes noise output by creating a secondary, cancelling noise field using vibrational inputs. The system includes one or more piezoceramic actuators mounted to the inner surface of the shroud of an aircraft engine. The actuators can be either mounted directly to the shroud or to one or more noise cancelling members which are resiliently mounted the shroud. Transducers are also provided for sensing the noise generated by the engine and producing an error signal corresponding to the level of noise sensed. A controller sends a control signal to the actuators in response to the error signal, thereby causing the actuators to vibrate and generate a noise field which minimizes the total noise emanating from the engine. The piezoceramic actuators can be thin sheets of piezoceramic material or can be in the form of a piezoelectric-driven mechanical lever arrangement.

21 Claims, 5 Drawing Sheets

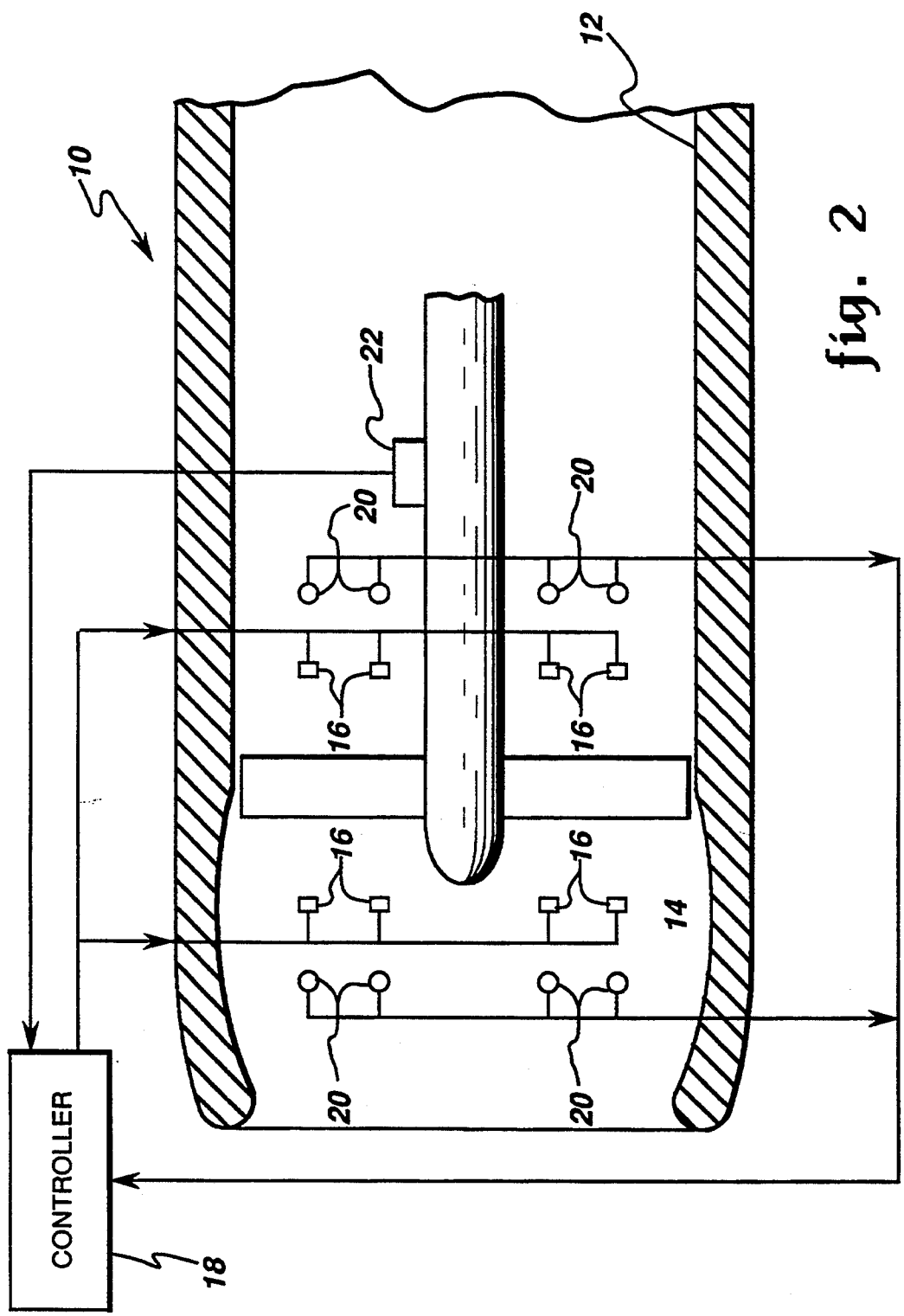

ACTIVE CONTROL OF AIRCRAFT ENGINE NOISE USING VIBRATIONAL INPUTS

This application is a continuation of application Ser. No. 07/787,471, filed Nov. 4, 1991, now abandoned.

BACKGROUND OF THE INVENTION

This invention relates generally to reducing noise using vibrational inputs and more particularly concerns a method and apparatus for minimizing the noise generated from an aircraft engine by shaking the engine or members attached to the engine to create a noise field which cancels the primary field.

Excessive noise has always been a problem confronting the aviation industry. Noise from discrete tones generated by the fans and turbines of modern aircraft engines is a major source of the noise problems. This is particularly true in communities surrounding airports which are subjected to the noise of take off and landing operations. Lately fan and turbine noise has become an important issue due to the louder fan noise of the large-thrust high bypass engines and the increased enactment and enforcement of strict community anti-noise regulations.

Turbine and fan noise has been addressed for many years using by employing passive techniques such as noise absorbing liners, tuned resonators, or a combination thereof. Such devices are usually mounted at the inlet and outlet of the engine to reduce noise radiated from the engine. Some disadvantages associated with these passive techniques include added weight and decreased thrust. Also, absorbent liners are generally ineffective against the long wavelengths of low frequency noise and tuned resonator are only useful at the frequency to which they are tuned.

One possible active approach to fan and turbine noise control is to cancel the noise using cancelling noise fields generated with acoustical inputs. However, the acoustical inputs, such as loudspeakers, are expensive, heavy, and require a relatively large amount of power. Thus, there remains a need for efficient, low weight, low power, and low cost noise reduction.

SUMMARY OF THE INVENTION

Accordingly, it is an object of the present invention to actively minimize aircraft engine noise by generating a cancelling secondary noise field.

More specifically, it is an object of the present invention to generate the cancelling noise by shaking the engine or a member attached to the engine using vibrational inputs.

In addition, it is an object of the present invention to generate the cancelling noise efficiently, with minimum weight penalty and structural modifications, and at low cost.

These and other objects are accomplished in the present invention by coupling one or more piezoceramic actuators to the engine. The actuators can be either mounted directly to the shroud of the engine or to a number of noise cancelling members which are resiliently mounted to the engine shroud. Transducers are also provided for sensing the noise generated by the engine and producing error signals corresponding to the level of noise sensed. A controller is included and has inputs connected to the noise transducers and outputs connected to the actuators. The controller is responsive to the error signals to determine a control signal which is sent to the actuators, thereby causing the actuators to vibrate and generate a noise field which minimizes the total noise emanating from the engine.

The piezoceramic actuators can be made of a thin sheet of piezoceramic material or can comprise a pair of levers, wherein one end of each lever is connected to the engine shroud and the respective other ends of the levers are or are not connected together at a flexure point. A piezoceramic element is situated between the levers. The actuators can be arranged with one group located upstream of the engine fan and another group located downstream of the fan. Similarly, a first group of the noise transducers can be located upstream of the fan and a second group of transducers can be located downstream of the fan.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

FIG. 2 is a schematic representation of the present invention;

DETAILED DESCRIPTION OF THE INVENTION

Figure 1A:
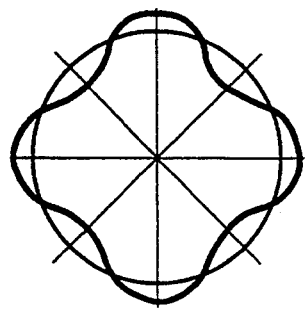
FIGS. 1A–1C show a typical acoustic spinning wave generated by a primary noise field, a secondary noise field, and the combined noise field, respectively.
Figure 1B:
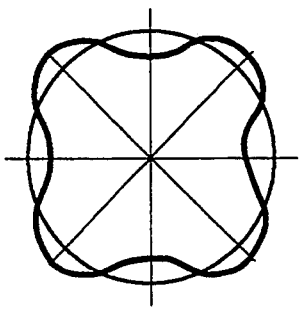
Figure 1C:
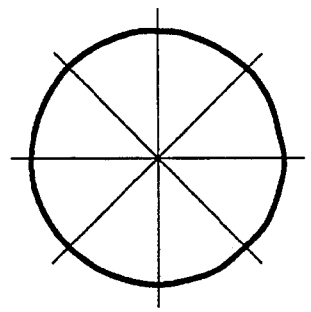

The underlying principle of the present invention is explained with reference to FIGS. 1A–1C. In FIG. 1A, the acoustic spinning wave generated by the primary noise source is shown. Figure 1B shows the acoustic spinning wave generated by the secondary or cancelling noise source. As can be seen in these figures, the secondary wave is 180° out of phase with the primary wave. The effect of the two waves being 180° out of phase is that they cancel one another out, thus eliminating noise. This can be seen in FIG. 1C where the composite wave has virtually zero amplitude.

Turning to FIG. 2, a schematic representation of the present invention is shown as implemented in an aircraft engine 10. The engine, which in itself does not form a part of the present invention, can be any typical turbine- or fan-driven aircraft engine. The engine 10 includes an outer shroud 12 and a fan 14. For the sake of clarity, the other parts of the engine are not shown.

In the present invention, vibrational input sources are provided to "shake" the engine structure and generate the secondary or cancelling noise field. FIG. 2 shows a plurality of vibrational actuators 16 attached to the inner surface of the engine shroud 12 which provide the vibrational input. The actuators can be either directly attached to the engine shroud 12 or indirectly coupled via a mounting arrangement which will be described below. The actuators 16 are controlled by an electronic controller 18 connected to each of the actuators. The controller 18 receives input from a plurality of noise transducers 20 and a tachometer 22. The transducers 20 sense noise generated by said engine and produce an error signal corresponding to the level of noise sensed. The transducers 20 can be microphones, piezoelectric transducers or any other type of device capable of sensing noise and producing an output thereof. The transducers 20 are generally located wherever noise is believed to emanate from. Preferably, an array of transducers is located upstream of the fan 14 and another array is located downstream of the fan 14. The tachometer 22 inputs the blade passage frequency of the fan 14 into the controller 18. In response to the inputs from the transducers 20 and the tachometer 22, the controller determines an appropriate control signal which is sent to each of the actuators 16. The control signal causes the actuators 16 to vibrate with the frequency and amplitude needed to create the proper secondary noise field for minimizing total noise.

In one embodiment, the actuators 16 are made of a thin sheet of piezoceramic material. The piezoelectric properties of the actuator 16 are such that it exerts an oscillating force on the plane of the structure. Structure-borne noise is then generated when in-plane vibrations change the shape of the cylindrical structure and produce bending motions. Piezoceramic actuators are lightweight, low power consuming devices which can be distributed over a large area and are designed to ensure good impedance matching with the acoustic field inside the engine shroud 12. The size of the actuators 16 depends on the acoustic power required to produce the secondary sound field. Ideally, actuators will be located both upstream and downstream of the fan 14. The number and placement of the actuators depends mainly on the modal order of the primary noise field to be cancelled. However, the number of vibrational actuators 16 needed in the present invention is less than the number of sources which would be needed for an active noise control system using acoustic sources such as loudspeakers. This is because the sound field obtained using structure-borne excitation (vibrational sources) more closely approximates the required cancelling field than a sound field obtained using nonstructure-borne excitation (acoustic sources).

Figure 3:
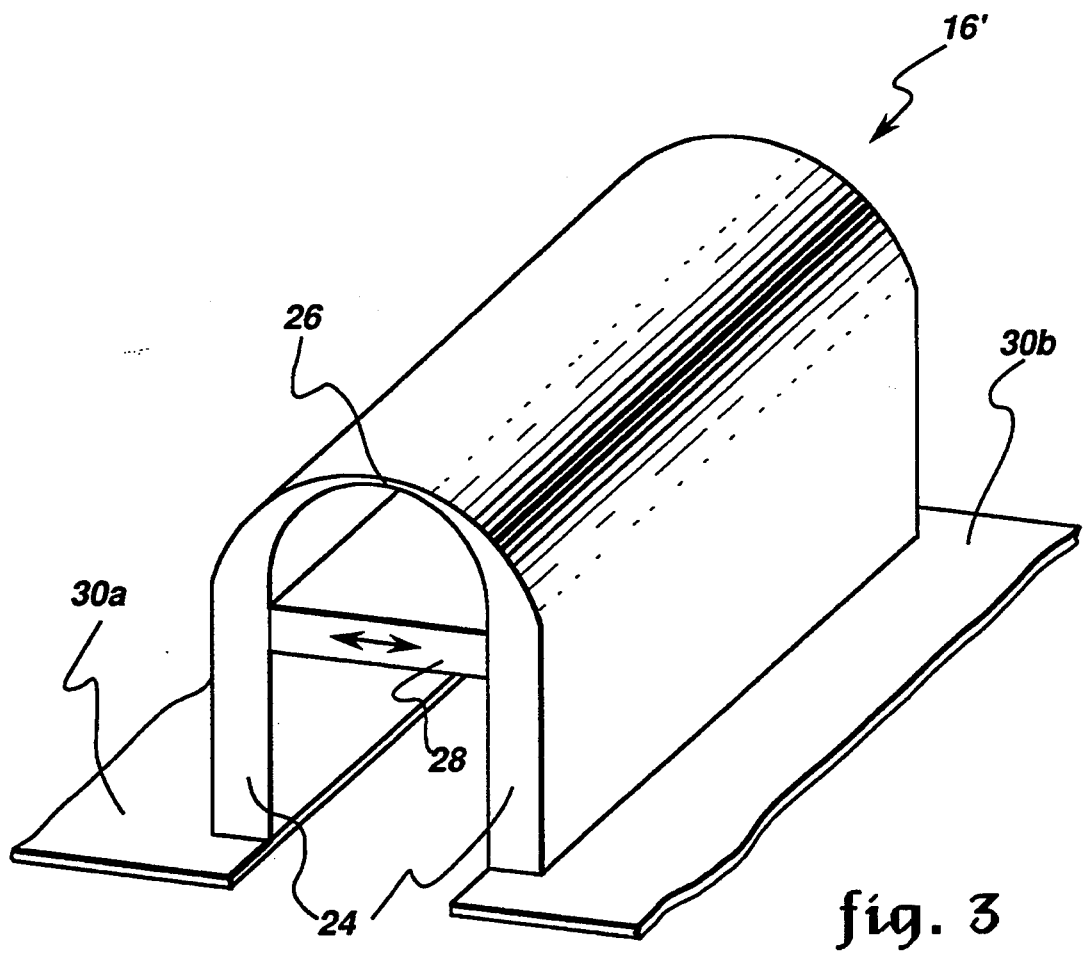
FIG. 3 is a perspective view of a piezoceramic actuator of the present invention.
Figure 4:
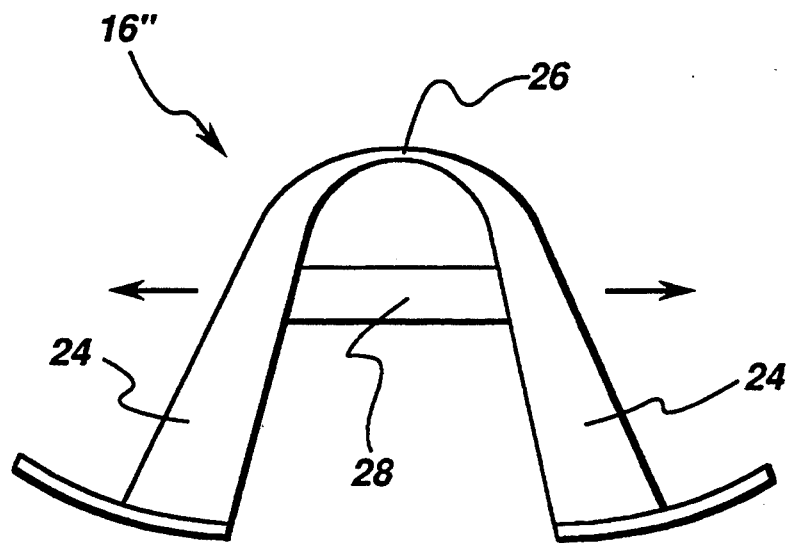
FIGS. 4 and 5 show the movement of the piezoceramic actuator of FIG. 3.
Figure 5:
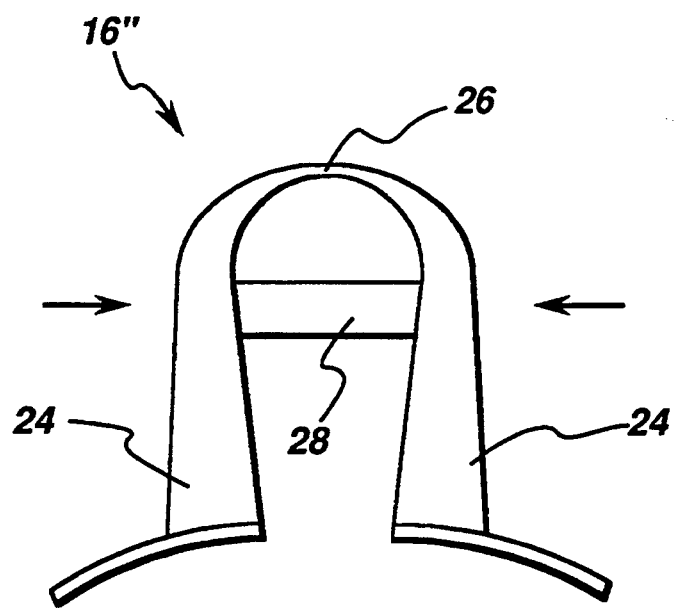

Instead of an actuator made of a thin sheet of piezoceramic material, other embodiments which employ mechanical lever arrangements are possible. Two preferred mechanical lever arrangements are shown in FIGS. 3-8. In FIG. 3, an actuator 16' is shown which comprises a pair of lever members 24. Respective ends of the lever members 24 are connected together at a flexure point 26 so that the actuator 16' forms a unitary, U-shaped assembly. The other ends of the two lever members are attached to respective structural members 30a,30b which are in turn attached to the engine shroud. A piezoceramic element 28 is disposed between the two lever members 24. When excited, the piezoceramic element 28 is displaced back and forth along the lateral directions shown by the arrow, thus causing the lever members 24 to essentially pivot back and forth about the flexure point 26 (see FIGS. 4 and 5). Consequently, the oscillating displacements of the piezoceramic element 28 are amplified and transferred through the lever members 24 to the structural members 30a,30b, thereby shaking the structural members to create the desired noise field. The entire assembly can be made very small since the maximum displacements required are only on the order of a few millimeters.

Figure 6:
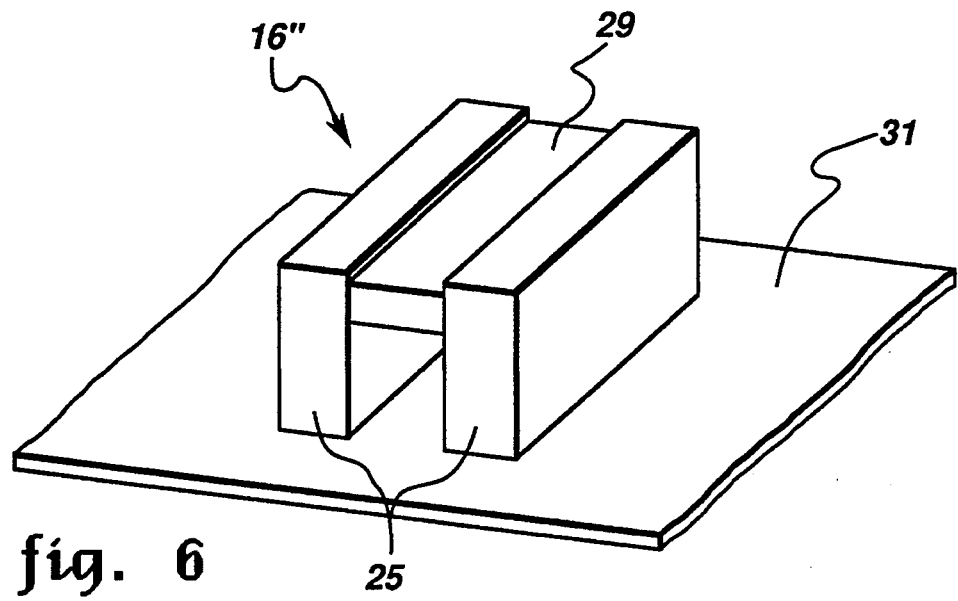
FIG. 6 is a perspective view of another piezoceramic actuator of the present invention.
Figure 7:
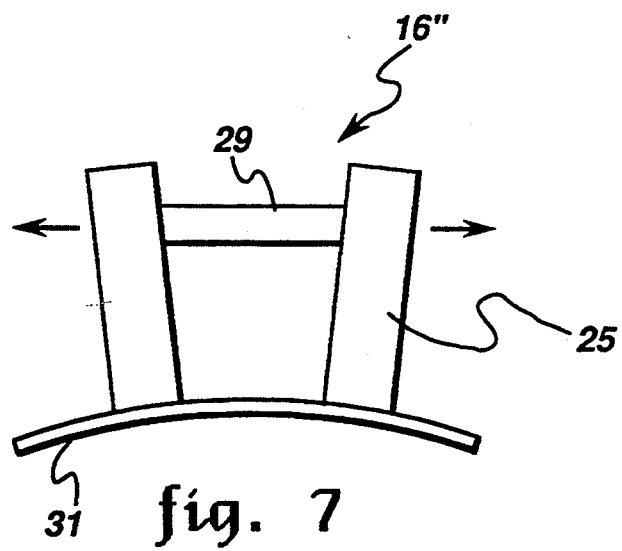
FIGS. 7 and 8 show the movement of the piezoceramic actuator of FIG. 6.
Figure 8:
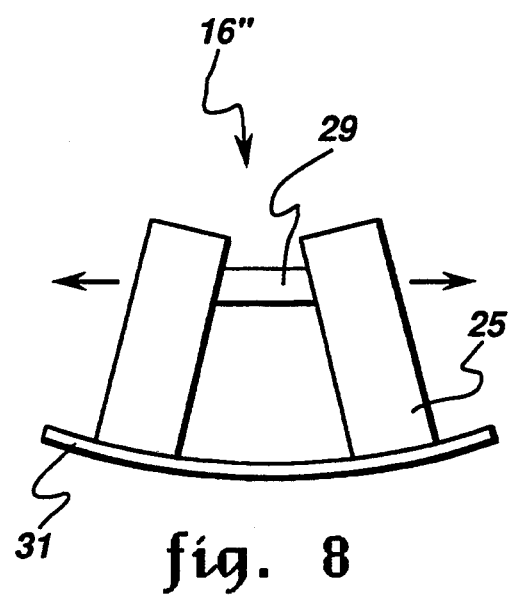

FIG. 6 shows another actuator 16" which comprises a pair of lever members 25. Each lever member 25 has one end attached to a structural member 31 and extends outwardly in a cantilever fashion. A piezoceramic member 29 is disposed between the two lever members. The piezoceramic member 29 exerts an oscillatory force on the lever members 25 along the directions shown by the arrows. Because the lever members are attached to the same structural member and are stiffer than the structural member 31, the oscillatory lateral displacements of the piezoceramic member 29 causes the lever members to pivot back and forth about a point on the structural member 31 in the manner shown in FIGS. 7 and 8. The creates the desired vibrations in the structural member 31.

Figure 9A:
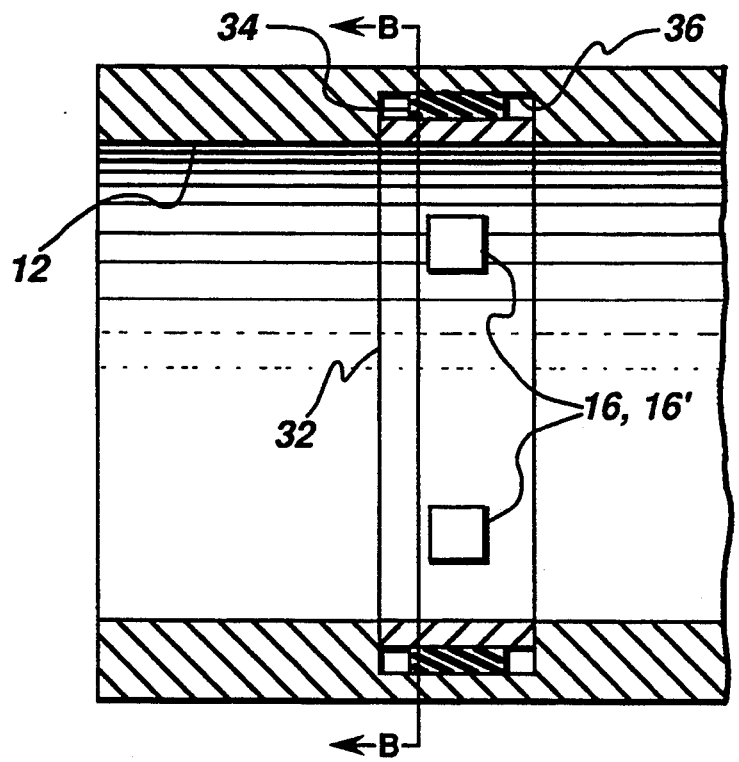
FIG. 9A is a cross-sectional view of the present invention showing a resilient mounting arrangement.
Figure 9B:
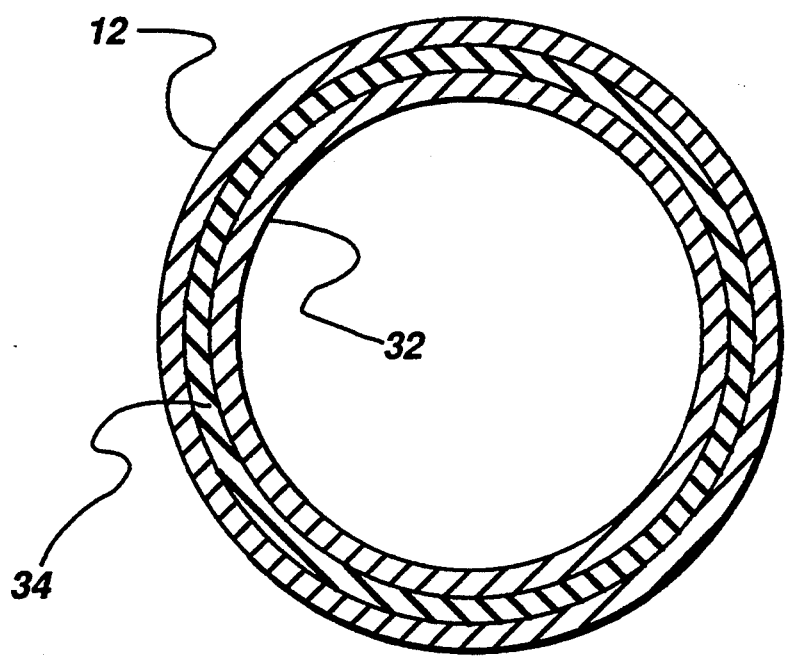
FIG. 9B is a cross-sectional side view taken along line A—A in FIG. 9A.

As mentioned above, the actuators can be either directly mounted to the shroud 12 of the engine 10 or can be indirectly mounted via a mounting arrangement. FIGS. 9A and 9B show such a mounting arrangement in detail. In FIG. 9A, the shroud 12 of the engine 10 is shown in partial cross-section. A noise cancelling member 32 is mounted to the inner surface of the shroud 12. As can be seen in FIG. 9B, the noise cancelling member 32 is in the form of a cylindrical ring or sleeve in order to snugly fit against the inner surface of the shroud 12. The actuators 16 are mounted to the noise cancelling member 32. Thus, the actuators shake the noise cancelling member 32 in order to generate the secondary noise field. Although only one noise cancelling member 32 is shown, any number as needed could be included. For instance, one noise cancelling member 32 with a plurality of actuators 16 could be located upstream of the engine fan, and a second noise cancelling member 32 with actuators could be located downstream of the fan.

The noise cancelling member 32 is preferably mounted to the engine shroud 12 by means of a resilient mounting member 34. The resilient mounting member 34 is preferably an elastic ring disposed between the shroud 12 and the noise cancelling member 32. The resilient mounting member 34 prevents the noise generating vibrations of the actuators from propagating to the critical parts of the engine 12. Ideally, the noise cancelling member 32 and the resilient mounting member 34 are disposed in an annular recess 36 formed in the inner surface of the engine shroud 12 so that the inner surface of the noise cancelling member 32 is flush with the surface of the shroud. This arrangement assures that the noise controlling structure does not interfere with engine performance.

The controller 18 can be implemented using one of a variety of standard control schemes known in the art. One preferred scheme uses a multi-input, multi-output (MI/MO) adaptive filtering approach based on the MI/MO Filtered-X LMS algorithm. Such an algorithm is described in the article "A Multiple Error LMS Algorithm and its Application to the Active Control of Sound and Vibration," *IEEE Transactions on Acoustic Speech and Signal Processing*, Vol. ASSP-35, No. 10, October, 1987, by Stephen Elliott et al. In such a control scheme, the control signals which are sent to the actuators 16 are adjusted in real time to minimize noise at the noise transducers 20. The controller 18 can react nearly instantly to any change in the RPM of the fan 14. Moreover, due to its adaptive nature, the controller is self-configuring and can self-adapt to changes in the system such as actuator or transducer failure.

The foregoing has described an active noise control system which minimizes noise output by creating a secondary, cancelling noise field with vibrational inputs. The system provides efficient, low cost noise reduction with a minimum weight penalty. Although the present invention as been described primarily for use with an aircraft engine, the invention can be used in almost any device where high-order acoustic modes propagating down a waveguide are to be eliminated. Examples of such devices include heat, ventilation, and air conditioning (HVAC) systems and turbine devices.

While specific embodiments of the present invention have been described, it will be apparent to those skilled in the art that various modifications thereto can be made without departing from the spirit and scope of the invention as defined in the appended claims.

What is claimed is:

1. An apparatus for minimizing noise emanating from an aircraft engine which has an outer shroud and a fan, said apparatus comprising:
   means for inducing noise cancelling vibrations in said shroud, said means for inducing noise cancelling vibrations being directly mounted to said shroud;
   means for sensing noise generated by said engine, said means for sensing noise producing an error signal corresponding to the level of noise sensed; and
   a controller having an input connected to said means for sensing noise and an output connected to said means for inducing noise cancelling vibrations, said controller being responsive to said error signal to determine a control signal which is sent to said means for inducing noise cancelling vibrations, said control signal causing said means for inducing noise cancelling vibrations to vibrate said shroud and generate a noise field which minimizes the total noise emanating from said engine.

2. The apparatus of claim 1 wherein said means for inducing noise cancelling vibrations comprises at least one actuator directly mounted to said shroud.

3. The apparatus of claim 2 wherein said at least one actuator comprises a thin sheet of piezoceramic material.

4. The apparatus of claim 2 wherein said at least one actuator comprises a pair of levers and a piezoceramic element situated between said levers, one end of each of said levers being coupled to said shroud.

5. The apparatus of claim 1 wherein said means for sensing noise comprises a first plurality of noise sensors disposed in said shroud upstream of said fan and a second plurality of noise sensors disposed in said shroud downstream of said fan.

6. The apparatus of claim 1 wherein said means for inducing noise cancelling vibrations comprises a plurality of actuators directly mounted to said shroud.

7. The apparatus of claim 6 wherein each one of said actuators comprises a thin sheet of piezoceramic material.

8. The apparatus of claim 6 wherein each one of said actuators comprises a pair of levers and a piezoceramic element situated between said levers, one end of each of said levers being coupled to said shroud.

9. An apparatus for minimizing noise emanating from an aircraft engine which has an outer shroud and a fan, said apparatus comprising:
   a noise cancelling member mounted to said shrouds, said noise cancelling member being substantially flush with said shroud;
   at least one actuator mounted to said noise cancelling member;
   means for sensing noise generated by said engine, said means for sensing noise producing an error signal corresponding to the level of noise sensed; and
   a controller having an input connected to said means for sensing noise and an output connected to said actuator, said controller being responsive to said error signal to determine a control signal which is sent to said actuator, said control signal causing said actuator to vibrate said noise cancelling member and generate a noise field which minimizes the total noise emanating from said engine.

10. The apparatus of claim 9 wherein said at least one actuator comprises a thin sheet of piezoceramic material.

11. The apparatus of claim 9 wherein said at least one actuator comprises a pair of levers and a piezoceramic element situated between said levers, one end of each of said levers being connected to said noise cancelling member.

12. The apparatus of claim 9 wherein said means for sensing noise comprises a first plurality of noise sensors disposed in said shroud upstream of said fan and a second plurality of noise sensors disposed in said shroud downstream of said fan.

13. The apparatus of claim 9 wherein said noise cancelling member is resiliently mounted to said shroud.

14. An apparatus for minimizing noise emanating from an aircraft engine which has an outer shroud and a fan, said apparatus comprising:
   a plurality of noise cancelling members mounted to said shroud, each one of said noise cancelling members being substantially flush with said shroud;
   a plurality of actuators, each one of said plurality of noise cancelling members supporting at least one of said actuators;
   means for sensing noise generated by said engine, said means for sensing noise producing an error signal corresponding to the level of noise sensed; and
   a controller having an input connected to said means for sensing noise and an output connected to each one of said actuators, said controller being responsive to said error signal to determine a control signal which is sent to each one of said actuators, said control signal causing said actuators to vibrate said noise cancelling members and generate a noise field which minimizes the total noise emanating from said engine.

15. The apparatus of claim 14 wherein said noise cancelling members are resiliently mounted to said shroud.

16. The apparatus of claim 14 wherein at least one of said plurality of noise cancelling members is located upstream of said fan and at least one other of said plurality of noise cancelling members is located downstream of said fan.

17. The apparatus of claim 14 wherein each of said plurality of actuators comprises a thin sheet of piezoceramic material.

18. The apparatus of claim 14 wherein each of said plurality of actuators comprises a pair of levers and a piezoceramic element situated between said levers, one end of each of said levers being coupled to a respective one of said plurality of noise cancelling members.

19. The apparatus of claim 14 wherein each of said plurality of actuators comprises a pair of levers and a piezoceramic element situated between said levers, one end of a first one of said levers being connected to a first one of said plurality of noise cancelling members and one end of a second one of said levers being connected to a second one of said plurality of noise cancelling members and the respective other ends of said levers being connected together at a flexure point.

20. The apparatus of claim 14 wherein said means for sensing noise comprises a first plurality of noise sensors disposed in said shroud upstream of said fan and a second plurality of noise sensors disposed in said shroud downstream of said fan.

21. A method of minimizing noise emanating from an aircraft engine having a shroud comprising providing a means for inducing noise cancelling vibrations in said shroud, said means for inducing noise cancelling vibrations being directly mounted to said shroud, and shaking the shroud of said engine with said means for inducing noise cancelling vibrations to generate a secondary noise field which minimizes the total noise emanating from said engine.

* * * * *